(12) United States Patent
Gingras

(10) Patent No.: US 9,085,850 B2
(45) Date of Patent: Jul. 21, 2015

(54) REVERSIBLE LOW ENERGY REFINER PLATES

(71) Applicant: ANDRITZ INC., Glens Falls, NY (US)

(72) Inventor: Luc Gingras, Harrogate (GB)

(73) Assignee: Andritz Inc., Glens Falls, NY (US)

( * ) Notice: Subject to any disclaimer, the term of this patent is extended or adjusted under 35 U.S.C. 154(b) by 244 days.

(21) Appl. No.: 13/849,267

(22) Filed: Mar. 22, 2013

(65) Prior Publication Data

US 2013/0270377 A1    Oct. 17, 2013

Related U.S. Application Data

(60) Provisional application No. 61/623,784, filed on Apr. 13, 2012.

(51) Int. Cl.
    *B02C 7/06*    (2006.01)
    *D21B 1/26*    (2006.01)
    *D21D 1/30*    (2006.01)

(52) U.S. Cl.
    CPC ... *D21B 1/26* (2013.01); *B02C 7/06* (2013.01); *D21D 1/30* (2013.01); *D21D 1/306* (2013.01)

(58) Field of Classification Search
    CPC .................................. B02C 7/06; B02C 7/12

USPC ..................... 241/261.2, 261.3, 296, 297, 298
See application file for complete search history.

(56) References Cited

U.S. PATENT DOCUMENTS

| 5,695,136 A | 12/1997 | Rohden et al. |
| 6,276,622 B1 | 8/2001 | Obitz |

FOREIGN PATENT DOCUMENTS

| EP | 1088932 A2 | 4/2001 |
| WO | 2011098147 | 8/2011 |

OTHER PUBLICATIONS

Examination Report, New Zealand patent application 608772, corresponding to U.S. Appl. No. 13/849,267, Apr. 12, 2013, pp. 1-2, New Zealand.

*Primary Examiner* — Mark Rosenbaum
(74) *Attorney, Agent, or Firm* — Kerri Hochgesang; Robert Hornung

(57) ABSTRACT

A system for refining lignocellulosic material including a first stator plate segment refining zone and a first rotor place segment refining zone, each of which has grooves. The rotor plate groove width is larger than the stator plate groove width in the inner part of the refining zone, but substantially similar in the outer part of the refining zone.

23 Claims, 8 Drawing Sheets

US 9,085,850 B2

REVERSIBLE LOW ENERGY REFINER PLATES

CROSS-REFERENCE TO PRIOR APPLICATION

This application claims the benefit of priority to U.S. App. No. 61/623,784 filed on Apr. 13, 2012, the entire content of which is incorporated herein by reference.

BACKGROUND OF THE INVENTION

1. Technical Field

This disclosure generally relates to an object of creating a low energy refiner plate combination which operates on a fundamental concept similar to "pumping low energy plates." The low energy refiner plate combination uses mechanical forces to increase the forward flow of pulp material in the refining gap, while also being reversible. The present invention relates to a system for refining lignocellulosic material, including a first stator plate segment refining zone and a first rotor plate segment refining zone, each of which have grooves. The rotor plate groove width is greater (wider) than the corresponding stator plate groove width at a corresponding distance measured from the inner edge of the refining area (rotor or stator plates) to the outer edge of the refiner plate (rotor or stator).

2. Related Art

There is generally a need for developing refiner plates for mechanical pulping processes that allow for a reduction in energy consumption during refining. One attempt at such development has involved the use of significantly coarser refiner plates, which increase refining intensity, but success has been limited. For example, it is believed that these plates produce poor pulp properties, and the energy savings achieved are usually quite limited.

In the 1990s, directional refiner plates were developed. Several versions of these plates exist, many of which use what is known in the art as bar "pumping angles" (also sometimes referred to as "feeding angles" or "bar angles"). Pumping angles are the angles formed by the bars relative to a central axis extending radially from the axis of rotation to the outer periphery of the plate, or relative to another radial line, so that in addition to causing refining impulses on a fiber mat, the bars and grooves are also used to promote pumping of the fiber material over the refiner plate segments. This design can reduce the time in which the fibers are retained in the refiner (frequently referred to as retention time), causing the fiber mat to be thinner and resulting in higher energy efficiency.

Although energy savings are appealing, many mechanical pulp mills have been unable to use conventional energy saving technology because their raw materials, which may contain too many contaminants and abrasives, are undesirable with such systems. A high level of contaminants or abrasives may also shorten the lifetime of a refiner plate. If refiner plates deteriorate (e.g., round over) through exposure to excessive amounts of abrasives or contaminants, pulp quality can deteriorate extremely fast. This forces the mill to change refiner plates frequently, making use of such plates economically impractical. To counter this wear problem, some mills reverse the direction of rotation of the refiner plates, e.g., every few days, to allow the edges of the bars on the plates to remain sharp for longer periods of time.

Accordingly, there is a need for an improved technology that would allow a mill to reverse the direction of rotation of its refiner plates, thus facilitating a benefit from the low energy refiner plate technology, while maintaining an acceptable wear life. It is to this need and others that the present disclosure is directed.

BRIEF SUMMARY OF THE INVENTION

The present disclosure generally relates to rotor and stator refiner plates for the mechanical refining of lignocellulosic material. Rotor and stator plates each have a pattern side and a back side, mounted such that the pattern sides of the rotor and stator plates oppose each other when operating in the refiner. The rotor and stator plates each are formed by rotor plate segments having a refining area and stator plate segments having a refining area, respectively.

A pair of refiner plates, formed of refiner plate segments (rotor and stator plates comprised of rotor plate segments and stator plate segments, respectively) may have differing groove widths, such that a rotor plate has a groove width or widths that are wider than corresponding groove width or widths on a stator plate at the same distance from the inner edge of the refiner plate to the outer edge of the refiner plate, also known as the refining area.

In one embodiment, a bi-directional pair of refiner plates for a disk refiner comprises a rotor plate and a stator plate, each having a different design. The rotor plate and stator plate each having a pattern side and a back side, mounted such that the pattern sides of the rotor and stator plates oppose each other when operating in the refiner. The rotor and stator plates are each comprised of rotor and stator plate segments, respectfully. The refiner (both rotor and stator) plate segments have a refining area covering a radial distance range between the inner edge of the refiner plate segment and the outer edge of the refiner plate segment. In one embodiment, the refining area has a length measured between an inner refining area edge and an outer refining area edge, where one or more of the refining area edges may coincide with the inner or outer edge of the refiner plate segment.

The refining area length is measured in a radial direction starting at the inner refining area edge, which is at a location where the pattern formed by the bars performs a refining function as opposed to a feeding function. The refining area length terminates at the outer refining area edge, which extends to the outer edge of the plate segment. In the refining area, as compared to the feeding area, the bars become narrower and more closely spaced so that the grooves between the bars become narrower. Additionally, the pattern formed by the bars and grooves may differ from the pattern of the bars and grooves in the feeding bar area (the feed bar area is also referred to as the breaker bar area). Said another way, the refining area is the radial distance from where breaker bars end to the outer edge of the refiner plate segment.

The refining area comprises one or more refining zones, each covering a different radial distance range between an inner edge of the refiner plate segment and an outer edge of the refiner plate segment. In one embodiment, these zones have a refining zone length measured between an inner refining zone edge and an outer refining zone edge, where one or more of the refining zone edges may coincide with the inner or outer edge of the refiner plate segment or the inner or outer edge of the refining area. The pattern formed by the bars and grooves is consistent within each refining zone, but can change from refining zone to refining zone. Therefore, the inner refining zone edge and outer refining zone edge for each refining zone is defined by a change in the width of the grooves between the bars.

The rotor and stator plate segments each have at least an innermost and an outermost refining zone within the refining area, with the innermost and outermost refining zones each at a corresponding radial distance range between the inner edges and outer edges of the rotor and stator plate segments, respectively. Each radial distance range has a length. The innermost refining zone of the refining area is closest to the inner refining area edge of the refiner plate segments. Relative to the grooves on the stator plate, the corresponding rotor plate grooves are substantially wider in a corresponding innermost refining zone, such that the wider rotor grooves are facing the narrower stator grooves when the plates are facing each other in a refiner. Further, in the outermost zone of the refining area, the groove width of the rotor plates is substantially equal to the groove width of the stator plates. The at least one innermost or outermost rotor plate segment refining zone has a different pattern of bars and grooves from the at least one innermost or outermost stator refining segment refining zone. In one embodiment, the innermost zone length represents at least 20 percent of the total refining area length when measured in a direction from the innermost edge of the refiner plate segment to the outermost edge of the refiner plate segment starting at the inner edge of the refining area and ending at point where the groove width changes, while the outermost zone represents no more than 50 percent of the total refining area length.

In an embodiment of the bi-directional refiner plate, the refining area of the rotor plate segment has an intermediate refining zone within the refining area. The intermediate refining zone is at a radial distance range between the innermost and the outmost refining zones of the refining area, and the grooves of the rotor plate segment in the intermediate refining zone are at least 20 percent wider than the grooves of the stator plate segment in the same corresponding radial distance range.

In another embodiment of the bi-directional refiner plate, the refiner plate segments include a breaker bar zone located between the inner edge of the refiner plate segments and the refining area.

The bi-directional refiner plates can be used in the flat portion of a refiner where the refiner has both flat and conical refining sections. In one embodiment of a system for refining lignocellulosic material in accordance with the present disclosure, a rotor plate segment has a first rotor plate refining area with at least one refining zone at a first radial distance range between an inner edge of the rotor plate segment and an outer edge of the rotor plate segment, the at least one refining zone having a refining zone length. Similarly, a stator plate segment has a first stator plate segment refining area with at least one refining zone at a second radial distance range between an inner edge of the stator plate segment and an outer edge of the stator plate segment, the at least one refining zone having a refining zone length.

In this embodiment, the first radial distance range and the second radial distance range overlap. The rotor plate segments and the stator plate segments are positioned to form rotor plates and stator plates. The rotor and stator plates are mounted in the refiner with their respective pattern sides opposing. When operational, the opposing and corresponding rotor and stator plate refining areas cross or overlap, thereby acting on the lignocellulosic material being fed into the refiner. The first rotor plate segment refining zone further comprises a series of alternating bars and grooves, where the grooves have a first rotor plate groove width. The first stator plate segment refining zone also further comprises a series of alternating bars and grooves, where the grooves have a first stator plate groove width. In this exemplary embodiment, the first rotor plate groove width is at least 50 percent larger than the first stator plate groove width. The first rotor plate segment refining zone has a length, the length being at 20 percent, 30 percent, 35 percent, 40 percent, or 50 percent of the distance between the inner edge of the rotor plate segment and the outer edge of the rotor plate segment.

Also in this exemplary embodiment, the rotor plate segment further comprises a second rotor plate refining zone at a third radial distance range between the inner edge of the rotor plate segment and the outer edge of the rotor plate segment. The third radial distance range is closer to the outer edge of the rotor plate segment than the first radial distance range. The stator plate segment comprises a second stator plate segment refining zone at a fourth radial distance range between the inner edge of the stator plate segment and the outer edge of the stator plate segment, where the third radial distance range and the fourth radial distance range overlap. The second rotor plate segment refining area having at least one refining zone comprising a series of alternating bars and grooves, where the grooves have a second rotor plate groove width, and the second stator plate segment refining area has at least one refining zone also comprising a series of alternating bars and grooves, where the grooves have a second stator plate groove width. The second rotor plate groove width is substantially equal to the second stator plate groove width. The second rotor plate refining zone has a length, the length being at least 10 percent and no greater than 20 percent, 30 percent, 40 percent, or 50 percent the distance between the inner edge of the rotor plate segment and the outer edge of the rotor plate segment.

In another embodiment of the invention, the rotor plate segment has a third rotor plate refining zone at a fifth radial distance range between the inner edge of the rotor plate refining segment and the out edge of the rotor plate segment. The third rotor plate refining zone also comprises a series of alternating bars and grooves, the grooves having a third rotor plate groove width. The fifth radial distance range is closer to the inner edge of the rotor plate segment than the first radial distance. Additionally, the stator plate segment comprises a third stator plate segment refining zone at a sixth radial distance range between the inner edge of the stator plate segment and the outer edge of the stator plate segment. This third stator plate segment refining zone also comprises a series of alternating bars and grooves, the grooves having a third stator plate groove width.

In yet another embodiment of the invention, the rotor plate segment comprises a rotor feeding zone at a seventh radial distance range between the inner edge of the rotor plate segment and the outer edge of the rotor plate segment. The seventh radial distance range begins at the inner edge of the rotor plate segment. The stator plate segment comprises a stator feeding zone at an eighth radial distance range between the inner edge of the stator plate segment and an outer edge of the stator plate segment. The seventh radial distance range and the eighth radial distance range overlap.

Although the groove widths vary in each of the described refining zones, it is not necessary for the actual width of the grooves to vary from refining zone to refining zone in both the rotor and stator plate segments, but the relative width between the rotor and stator plate segments in the overlapping or corresponding refining zones must be different. It is possible, for example, to have a constant stator groove width in two or three stator refining zones, but the changes in the rotor groove width in the respective refining zones provides the necessary change in groove width ratio between the rotor and stator plate segments.

These features, and other features and advantages of the present invention will become more apparent to those of ordinary skill in the art when the following detailed description of the preferred embodiments is read in conjunction with the appended figures.

DETAILED DESCRIPTION OF THE INVENTION

Figure 1:
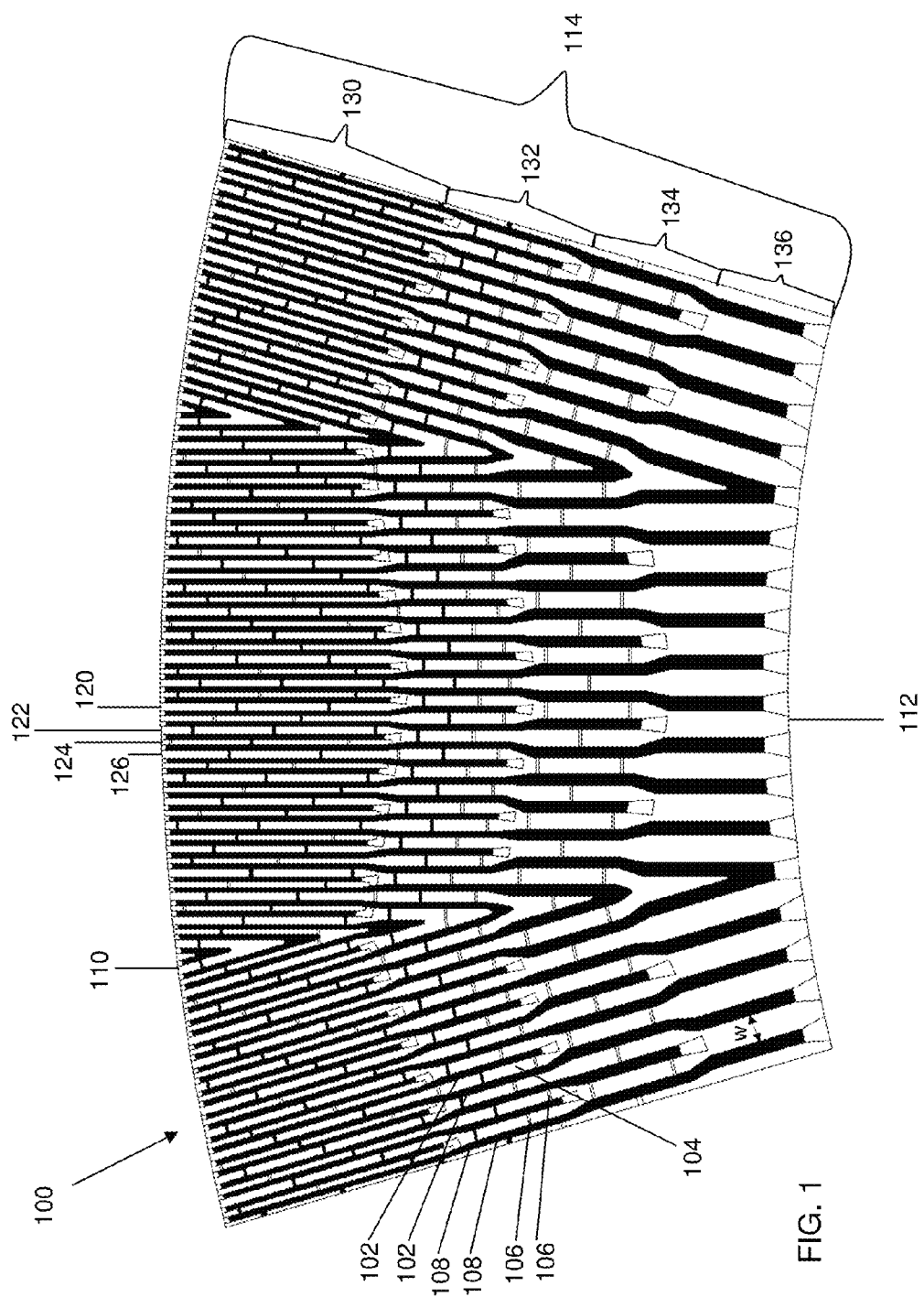
FIG. 1 is an illustration of an embodiment of a rotor refiner plate segment having a pattern in accordance with the present invention.

Different principles can be used to increase a feeding rate across a refining area of a single-disk refiner for refining lignocellulosic material featuring a rotating disk (rotor disk) and a stationary disk (stator disk). The dry contents consistency of the lignocellulosic materials used as feedstock can be at least 10 percent or, alternatively, can be at least 20 percent. The embodiments of the present disclosure may be used in connection with a flat refiner, a conical disk refiner, and/or any other suitable refiner for mechanically refining lignocellulosic material, and is applicable to flat (disk) plates. The conical or other suitable refiners include refining areas with refining zones.

It is believed that forming pumping angles with the bars will help to feed the material faster, and thus reduce retention time of the material within the refining areas, which would reduce the time the material is being refined. A faster material feed is caused by the alignment of frictional forces during a bar crossing event. Such frictional forces may contribute into an outward force vector, facilitating the movement of particles toward the periphery of the refining area.

In accordance with the present disclosure, the rotor plate can be the dominant disk performing a greater portion of the pumping action. Many refiners use a rotor disk, usually rotating at speeds between 900-2300 revolutions per minute (RPM), as opposed to a stator disk which does not rotate. Wood chips or fibrous or lignocellulosic material is typically fed through the center of the stator disk, and the rotor disk feeds this material into a gap by imparting a rotation to the material. In single-direction feeding plate designs, bars are generally formed at a pumping angle that allows the frictional forces created by the crossing of the bars from the rotor plate and stator plate to impart an outwardly directed frictional force. Such frictional force comes in addition to the centrifugal force caused by the rotation of the feed material. This rotation may take place in the rotor plate spacings between the bars (in the grooves), as well as, to a limited extent, the area situated between the top of the rotor plate bars and the top of the stator plate bars (e.g., the "gap" between the respective plate faces). A portion of the material to be refined, which is situated in the stator plate grooves, does not rotate. because there is no rotational force on the material in stator plate grooves, the portion of the material being refined tends to stall and increase the average retention time for the material in the refiner, causing an increase in the energy required to produce the pulp.

Once in the gap between rotor and stator bars, the material is pulled between the static element and the rotating one. The fiber pad is a dynamic entity that keeps breaking apart and re-forming. When fibers pull out of the fiber pad, they can either move into a rotor plate groove or a stator plate groove. Those fibers going into a rotor plate groove can be accelerated to the full rotational speed of the refiner, and thus gain significant momentum toward the periphery of the refining area. The fibers going into the stator plate grooves will stall, because there is no longer any centrifugal force acting upon them. The fibers going into the stator plate grooves will be transported by the steam flow in the refiner, but it is believed that fibers going into stator plate grooves will remain in the refining area for a significantly longer period of time than those going into rotor plate grooves.

Increasing the likelihood that fibers breaking out of the fiber pad end up in the rotor plate grooves as opposed to the stator plate grooves may reduce the overall retention time of the material in the refiner, and thereby reduce the energy levels needed by the refiner. In one aspect, the present disclosure relates to producing pulp at low energy levels, using a refiner plate that can be reversed, such that an overall retention time of the material can be achieved. To accomplish low energy refining using bi-directional refiner plates (refiner plates having a direction of rotation capable of being reversed), a basic principle is to match rotor and stator plates featuring different groove widths. For instance, by using wider grooves on the rotor plate, the likelihood of fiber moving from the gap between the rotor and stator plates to the rotor plate grooves is much greater than the likelihood of the material moving from the gap between the rotor and stator plates into stator plate grooves. This increases the ratio of fiber in the rotor plate grooves compared to stator plate grooves, and thus will increase the feeding effect and reduce retention time having the same result in both directions of rotation.

The foregoing detailed description of the preferred embodiments is presented only for illustrative purposes and is not intended to be exhaustive or to limit the spirit and scope of the invention. The embodiments were selected and described to best explain the principles of the invention and its practical application. One of ordinary skill in the art will recognize that many variations can be made to the invention disclosed in this specification without departing from the scope and spirit of the invention.

Illustrative embodiments of a reversible or bi-directional refiner plate in accordance with the present invention are shown in FIGS. 1-2 and 5-8. The present invention is a reversible refiner plate which, when used, results in low energy consumption as compared to conventional reversible refiner plates. Currently, there is a need for an improved refiner plate that would allow a mill to reverse the direction of rotation of its refiner plates, thus facilitating a benefit from the low energy plate technology, while maintaining an acceptable wear life.

Figure 2:
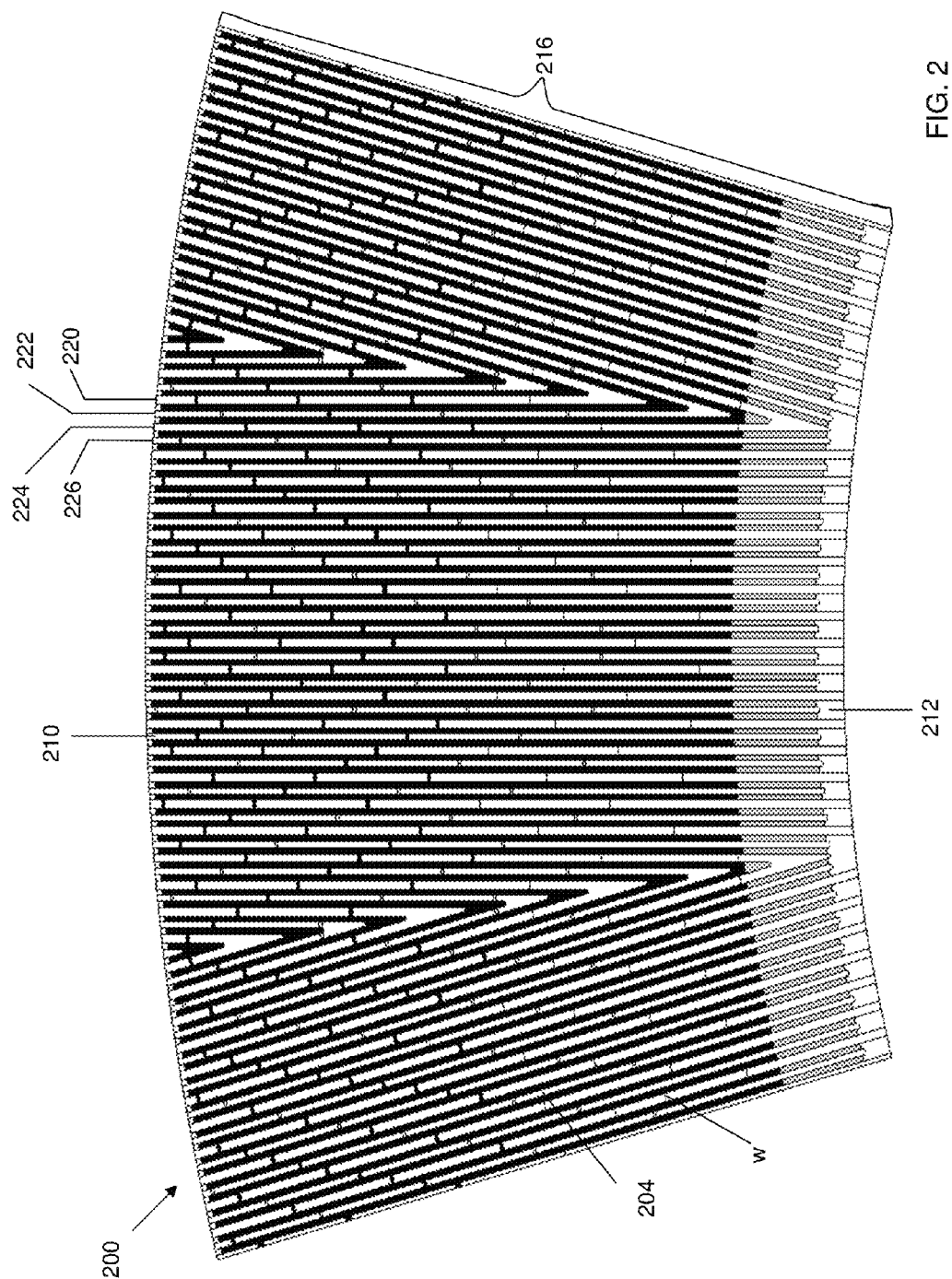
FIG. 2 is an illustration of an embodiment of a stator refiner plate segment having a pattern in accordance with the present invention, suitable for use in combination with the rotor plate of FIG. 1.

Referring now to FIG. 1, a refiner rotor plate segment 100 is illustrated, having four refining zones (130, 132, 134, and 136) which comprise a refining area 114, where the central refining zones 132 and 134 have a coarser pattern of bars 102 and grooves 104 compared with a corresponding location on a complementary stator plate segment 200 (FIG. 2). The bars 102 alternate with the grooves 104, and dams 106 and 108 may be contained within grooves 104. The dams 106 and 108 may be full-height, partial-height, or any other height combination that impedes the movement of fibers in the grooves 104 toward outer edge 110 of the rotor plate segment 100. Both of the rotor refiner plate and the stator refiner plate are comprised of bi-directional (reversible) segments, i.e., the rotor plate segments 100 and the stator plate segments 200.

The rotor plate segment 100 includes four refining zones (130, 132, 134 and 136) within the refining area 114, which can contain different bar widths and groove widths W. The rotor plate segment 100 is typically used in large refiners, which typically feature a separate breaker bar ring (not shown). The breaker bar ring is located adjacent to the inner edge 112 of the refiner rotor plate segment 100 near the axis of rotation of the plate. A breaker bar ring, which is found on refiner plate segments of most small, conventional refiners, can include one or more breaker bar zones. In larger refiners, the breaker bar zone is often built on a separate refiner segment of a concentric ring of segments situated inward of the main refining area.

Breaker bar zones generally have very large spaces between the bars with few solid breaker bars, and typically feature groove widths greater than 10 mm in most cases, and often greater than 20 mm. The spacing between the tops of rotor breaker bars and stator breaker bars is generally significantly greater than the spacing of the bars in the refining area during refiner operation. The latter is usually 0.2-1.5 mm, while the former is normally in excess of 3 mm. It should be understood that any type of breaker bar design could be used in connection with this invention.

In one exemplary embodiment, the rotor refining area 114 ideally comprises at least two of the four refining zones (e.g., 130, 132, 134 and 136), and can comprise three, four, or more of such refining zones (e.g., 130, 132, 134 and 136, or more), with one or more of such refining zones (e.g., 130, 132, 134 and 136), having different bar 102 spacing (or groove width W). In this exemplary embodiment, FIG. 1 shows four refining zones 136, 134, 132, and 130. The complementary stator 200 (FIG. 2) can have, for example, only one refining zone 216 or multiple refining zones (not shown). In the outermost rotor refining zone(s) (e.g., refining zone 130), which covers up to 50 percent of the refining area 114 (e.g., 40 percent, 30 percent, 25 percent, etc.), or preferably a maximum of 40 percent of the refining area 114. The average groove width W may be equal to or substantially the same as that of the stator plate 200, so that the retention time of the lignocellulosic material in the outermost refining zone 130 is substantially similar to that of conventional plates, thereby allowing for the maximization of refiner loadability and the development of desirable fiber properties. The term "substantially similar," in this instance, can refer to a difference of 15 percent or less, preferably in a range between 10 percent to 5 percent, or less. The rotor grooves 104 are preferably no more than 15 percent wider than stator grooves 204 (e.g., 220, 222, 224, and 226 of FIG. 2), or preferably no more than 10 percent to 5 percent wider than the stator grooves 204 on the stator plate segment 200 opposing the corresponding rotor plate segment 100.

By contrast, the innermost refining zone(s), e.g., refining zone 136, or the combination of refining zone 136 and refining zone 134 of the refining area 114 on the rotor plate segment 100 can have groove widths W substantially wider (e.g., 50 percent or more, such as 60 percent, 75 percent, 90 percent, 100 percent, 125 percent, 150 percent, 200 percent, or more) than on the opposing refining zone 216 on the stator plate segment 200. In this exemplary embodiment, the groove widths W of the rotor plate segment 100 are at least 50 percent wider than the groove widths W of the stator plate segment 200. In a preferred embodiment, the groove width W is 75 percent wider, or 100 or more percent wider, than the opposing stator grooves 204. This innermost refining zone (e.g., 136) featuring much wider grooves 104 of rotor plate segment 100 compared to the grooves 204 of the stator plate segment 200 covers at least 20 percent of the refining area 114, and preferably covers more than 25 percent, and more preferably covers 30 percent or more of the total refining area 114. Alternatively, the length of the innermost refining zone is at least 20 percent of the length of the total refining area length, and preferably is more than 25 percent of the total refining area length, and more preferably is 30 percent or more of the total refining area length.

In this embodiment, the central portion of the refining area 114 situated between the innermost refining zone 136 and outermost refining zone 130 (e.g., intermediate refining zone 132 and potentially including refining zone 134) has grooves 104 at least 20 percent wider than the stator grooves 204, and preferably the grooves 104 are 30 percent wider, or more (e.g., 20 percent or more, such as 25 percent, 30 percent, 35 percent, 40 percent, 50 percent, 60 percent, 75 percent, 90 percent, 100 percent, or more). An intermediate refining zone (e.g., 132 or 132 and 134) is optional, and may not exist if the innermost refining zone (e.g., 136, or 136 and 134) of the rotor plate segment 100 extends all the way to the outer refining zone (e.g., 130) of the rotor plate segment 100, as described earlier.

In one embodiment of the present invention, FIGS. 1 and 2 show a rotor plate segment 100 and a stator plate segment 200 that can be used in combination with each other. In one embodiment, the rotor plate segment 100 has two refining zones (e.g., two or more of 130, 132, 134, or 136), and the opposing stator plate segment 200 has a single refining zone 216. In other embodiments, the rotor plate segment 100 has more than two refining zones (e.g., three or more of 130, 132, 134, or 136), and the opposing stator plate segment 200 has only one refining zone 216. Alternatively, the rotor plate segment 100 and stator plate segment 200 have more zones, in which case it is preferred that the geometry of the relative groove width W between rotor and stator plate segments 100 and 200 are maintained. In this embodiment, it is preferred that: (1) the groove width W of grooves 104 on the rotor plate segment 100 in the outermost refining zone 130 is, at a minimum, substantially similar to the groove width W of the opposing grooves 204 on the stator plate segment 200, and that (2) at least one innermost refining zone (136, or 136 and 134) on the rotor plate segment 100 has grooves 104 with a groove width W substantially larger than the grooves 204 on the stator plate segment 200 at a similar radial location between the bottom edge 112 and the outer edge 110 of the rotor plate segment 100.

In one embodiment, the rotor and stator plate segments 100 and 200 are designed to be bi-directional (or reversible), which means that each pattern has the same geometry when running in either a clockwise or a counter-clockwise direction. Generally, bi-directionality can be achieved by having both halves of the pattern on the plate segment mirrored across the centerline of the plate segment, but one skilled in the art of refiner plate design could conceive of a plate segment design that is bi-directional or reversible without having such symmetry across the centerline axis.

In another alternative embodiment, the rotor refining area 114 is made of four refining zones 130, 132, 134, and 136, each having a different level of coarseness, (groove width W). The groove widths W of the rotor plate segment 100 in the outermost refining zone 130 are substantially similar to the groove widths W of the stator plate segment 200, such that a greater percentage of total energy is applied near the periphery of the plates.

In this embodiment, the outermost refining zone 130 of rotor plate segment 100 has uneven spacing of the bars 102 and grooves 104, where the groove width W differs and/or alternates from groove to groove (e.g., 120, 122, 124, and 126). For example, rotor plate grooves 120 and 124 (which may be the same width or a different width) may have a different width compared to grooves 122 and 126 (which also may be the same or different widths compared to each other). In this embodiment, the configuration of rotor plate segment 100 groove widths W may be similar to the stator plate segment 200 groove width W configuration, e.g., as illustrated by stator plate grooves 220, 222, 224, and 226 of the stator plate segment 200. This outermost refining zone 130 of the rotor plate segment 100 is relatively short, with a length typically measuring in a direction from the inner edge 112 to the outer edge 110 of between 30 and 120 mm, depending on the pulp quality required and the energy reduction required, as well as the diameter of the refiner.

The outermost zone 130 is conventionally believed to be where a substantial portion of the refining energy will be imparted when using low energy refiner plate combinations, and when using substantially similar groove widths W on both the rotor plate segments 100 and the stator plate segments 200. The outermost refining zone 130 is, in one embodiment, less than 50 percent (e.g., 40 percent, 30 percent, 25 percent, 10 percent, etc.) of the entire refining area 114.

From the inlet of the refining area 114, located at the inner edge 112 of the rotor plate segment 100, in one embodiment, the rotor plate grooves 104 are substantially wider when compared to the opposing stator plate grooves 204. In this embodiment, the substantially wider rotor plate grooves 104 have different and distinct bar and groove patterns in the innermost refining zones 134 and 136 of the rotor plate segment 100, and the innermost refining zones 134 and 136 should comprise, at a minimum, 20 percent (e.g., 25 percent, 30 percent, 40 percent, 50 percent, etc.) of the total refining area 114 (e.g., as measured by the radial distance from the inner edge 112 to outer edge 110).

In another embodiment, intermediate refining zone 132 of the rotor plate segment 100 has groove widths W that are at least 20 percent wider (e.g., 25 percent, 30 percent, 50 percent, 60 percent, 75 percent, 100 percent, etc.) than the groove widths W of the stator plate segment 200 opposing it. This intermediate refining zone 132 is optionally present, depending on the desired energy and quality levels for the given application.

The ratio of groove widths W between the rotor plate segment 100 and the stator plate segment 200 in a given refining area 114 and 216 can determine the increase in feeding effect. When the rotor plate segment grooves 104 are much wider than the stator plate segment grooves 204, the feeding effect is more significantly increased. In some embodiments, it is preferable to have grooves 104 in the innermost refining zones 134 and 136 that are at least 50 percent wider than the grooves 204 on stator plate segments 200. In other embodiments, it is preferable to have wider grooves 204, e.g., 75 percent, 100 percent, or 150 percent wider, on the rotor plate segments 100. The higher the ratio is between rotor plate segment groove width W and stator plate segment groove width W, the more advantageous feeding effect will be obtained.

As set forth herein, a comparison of the average groove width W of the rotor plate segment 100 and the stator plate segment 200 may be used as a proxy for relative groove widths W in plates having varied groove widths W. It is possible to compare an average (e.g., as expressed by an arithmetic mean, median, or mode) of the relative groove widths W of the rotor and stator plate segments (100 and 200). In one embodiment, there is more than one refining zone 130, 132, 134, and/or 136 having different bar 102 and groove 104 configurations in the refining area 114.

In one embodiment, there is more than one refining zone (130, 132, 134, and/or 136), with intermediate refining zones (132 and 134). The intermediate refining zones 132 and 134 may have various configurations, except that the grooves 104 of the rotor plate segment 100 in such embodiments should be wider than the corresponding grooves 204 on the stator plate segment 200. In a preferred embodiment, the rotor groove widths W in the refining zones that are not the outer refining zone (132, 134, or 136) should be at least 20 percent wider than the stator groove widths W, so long as there is an innermost refining zone (136) having groove widths W that are at least 50 percent, 75 percent, 100 percent, 150 percent (or a percentage that is another multiple of 25 percent that is greater than 50 percent) wider than the groove widths W of the stator plate segments 200 opposing such rotor plate segments 100.

Figure 3:
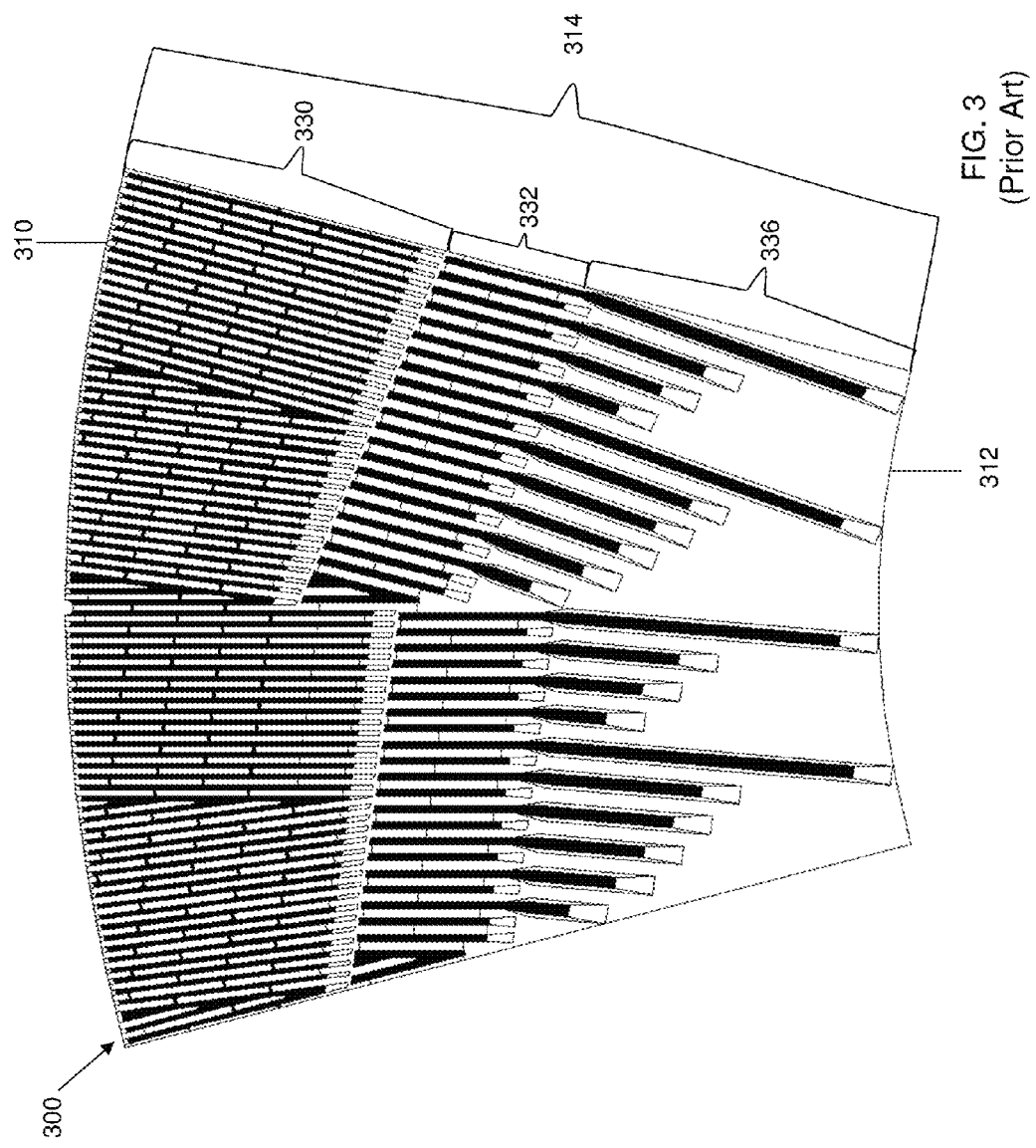
FIG. 3 is an illustration of a conventional refiner plate segment pattern for a low energy refiner plate, having a pumping angle.

FIG. 3 shows a conventional low energy, but not reversible, refiner plate segment 300 that uses feeding angles at the transitions between refining zones 336, 332, and 330. Lignocellulosic material is fed near inner edge 312, and travels toward outer edge 310 during the refining process. These rotor plates can be opposite a stator plate having a similar pattern, or the opposing rotor and stator plates can have different design configurations, usually with similar bar and groove widths. Such designs operate completely differently in one direction of rotation compared to the other, so such designs are not reversible. In conventional low energy refining equipment, stator and/or rotor plates having a similar pattern to that illustrated in FIG. 3 may be used, preferably with the groove widths W of the rotor being substantially equal to or greater than the corresponding groove widths W of the stator. The increased feeding of this existing technology is relying on the pumping angle on the bars which align frictional forces in the gap to reduce retention time of the fibers in the refining area 314.

Figure 4:
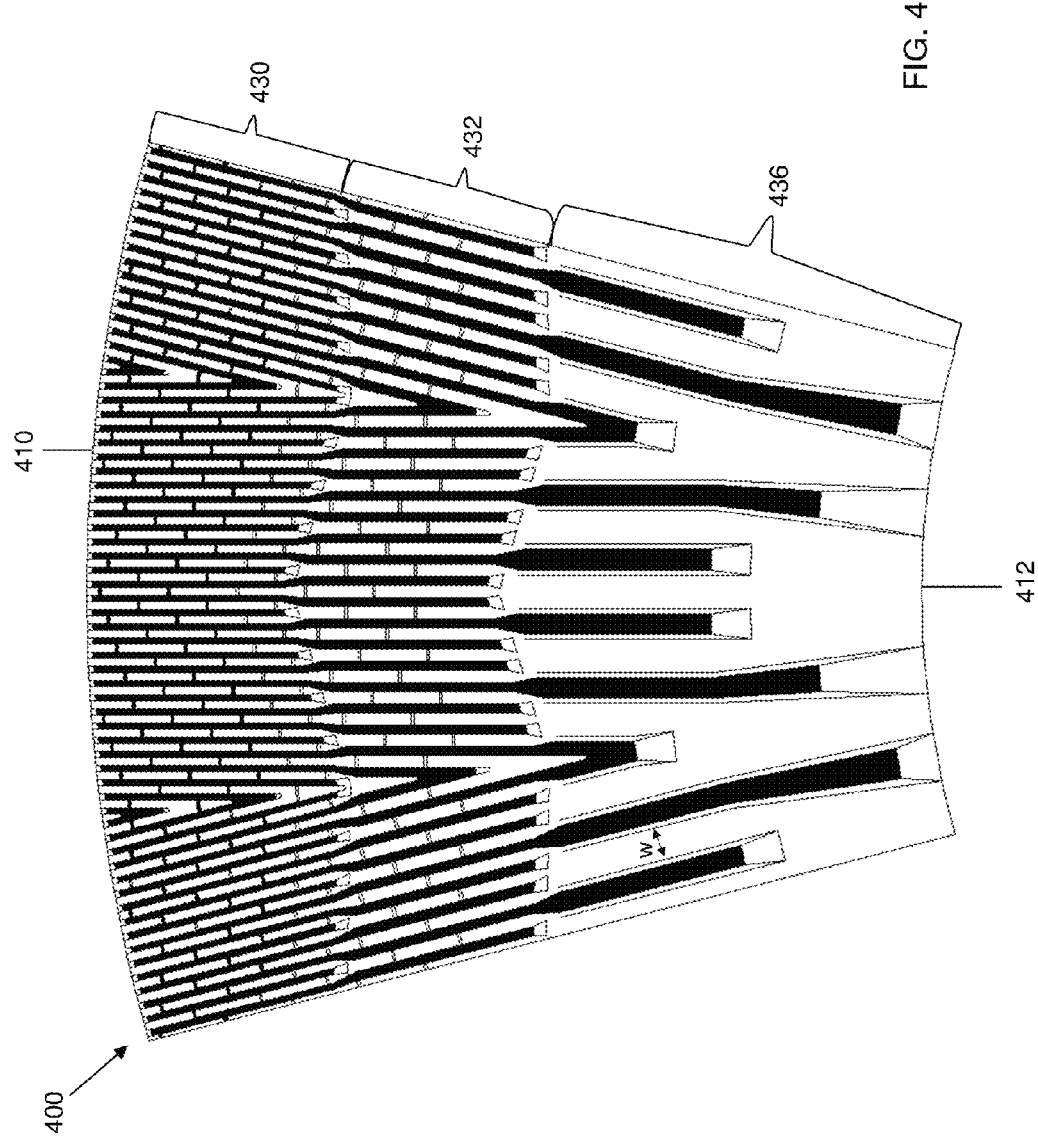
FIG. 4 is an illustration of a conventional refiner plate segment pattern which is not suitable for low energy refining.

FIG. 4 shows a conventional bi-directional or reversible refiner plate segment 400, which is not suitable for low energy refining. The bi-directional refiner plate segment 400 contains breaker bar zone 436, and two refining zones: 432 and 430. Lignocellulosic material is fed near inner edge 412, and travels toward outer edge 410 during the refining process. This refiner plate segment 400 does not promote low energy consumption, because the retention time for the feed material tends to be relatively high, which may lead to increased frictional energy and less efficiency. This type of refiner plate segment 400 is usually run on both a rotor and a stator, so there is no dominant element or disk between the stator and rotor disks. In an embodiment of the present invention, such a refiner plate segment 400 is combined with a rotor plate segment having a substantially coarser innermost refining zone (432), or combining it with a stator plate segment having a substantially finer innermost refining zone (432). In each case, the pattern of the outermost refining zone 430 would be substantially similar.

Figure 5:
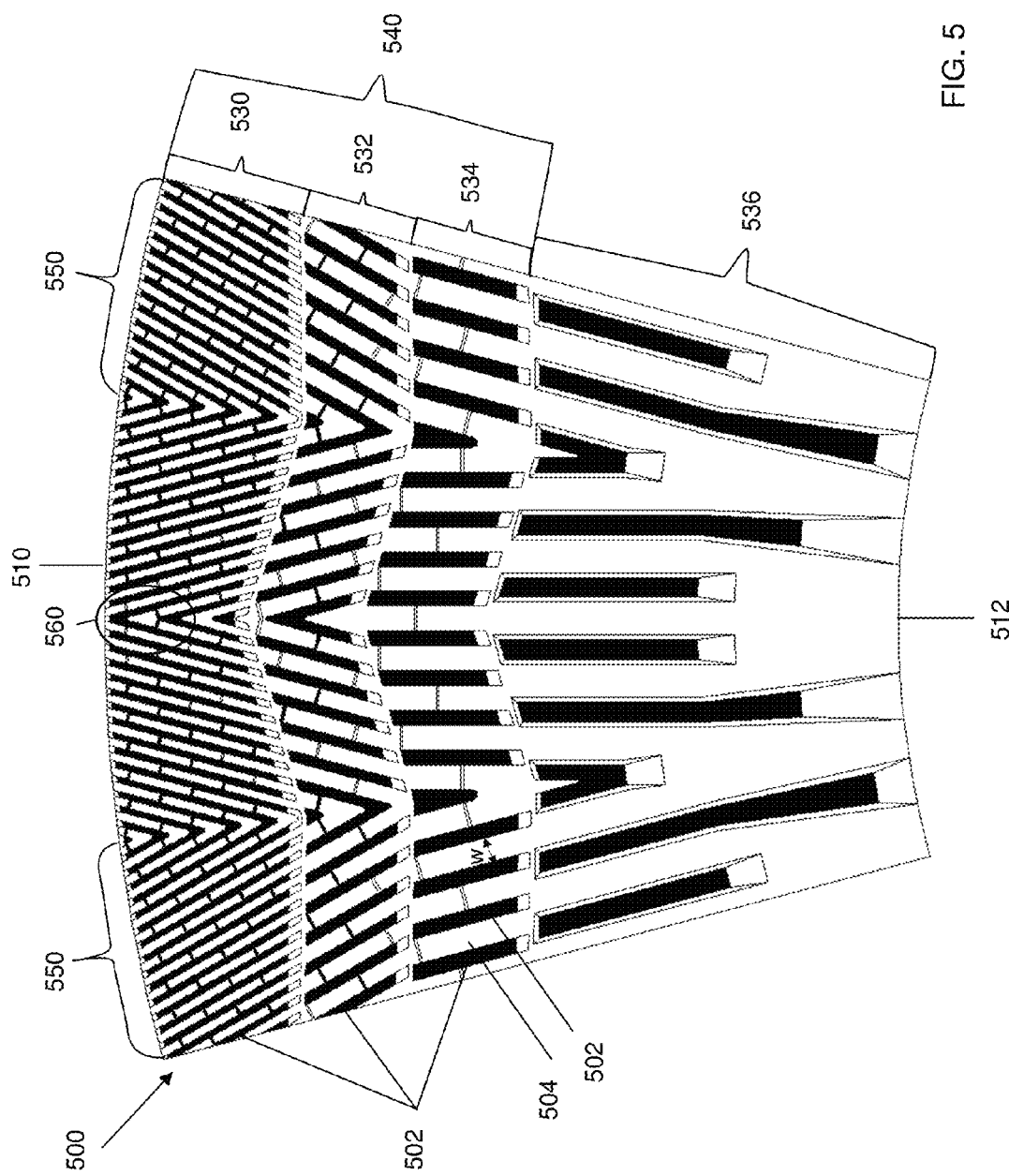
FIG. 5 is an illustration of an alternative embodiment of a refiner rotor plate segment pattern in accordance of the present invention.
Figure 6:
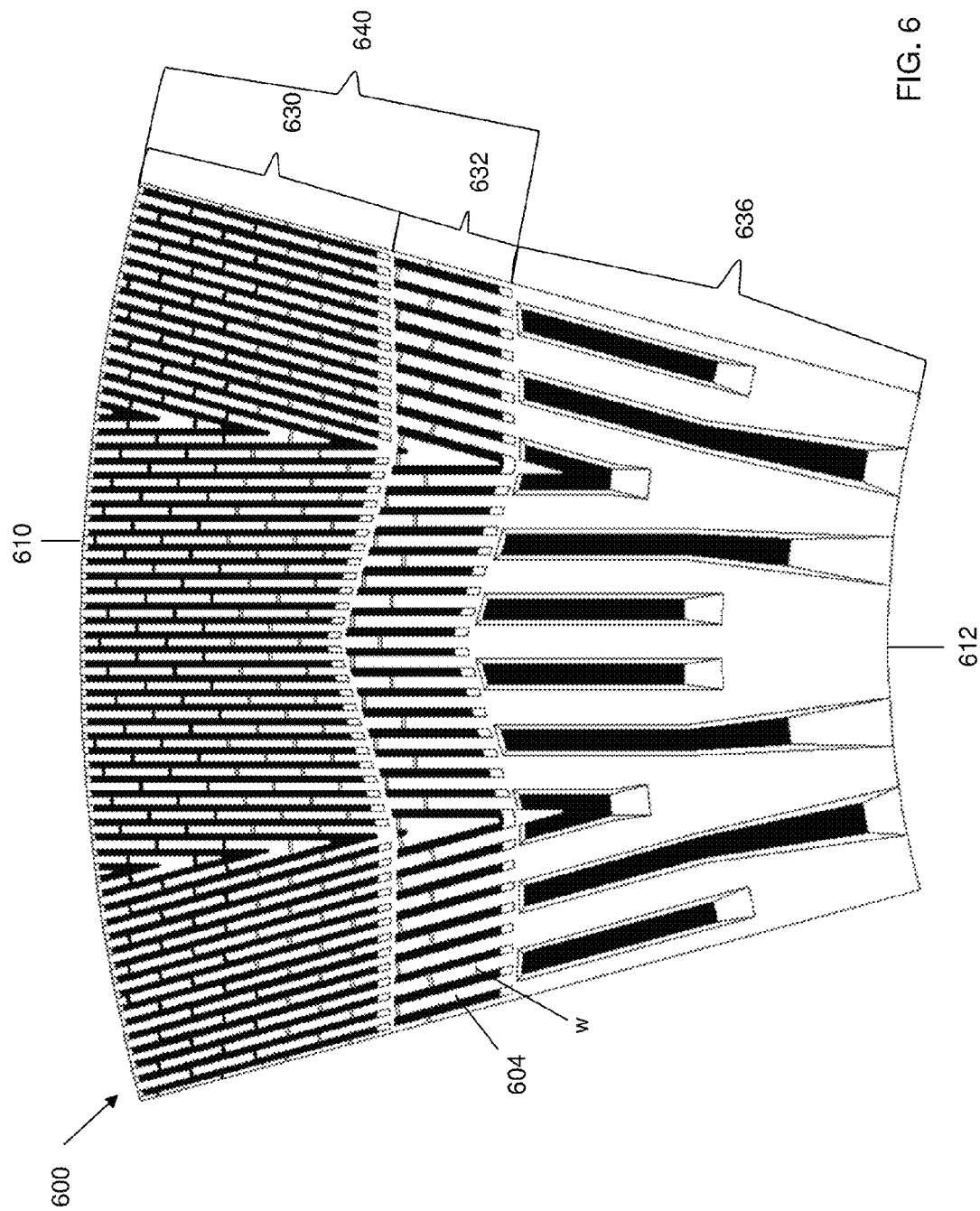
FIG. 6 is an illustration of another alternative embodiment of a refiner stator plate segment pattern in accordance with the present invention, suitable for use in combination with the rotor plate segment of FIG. 5.
Figure 7:
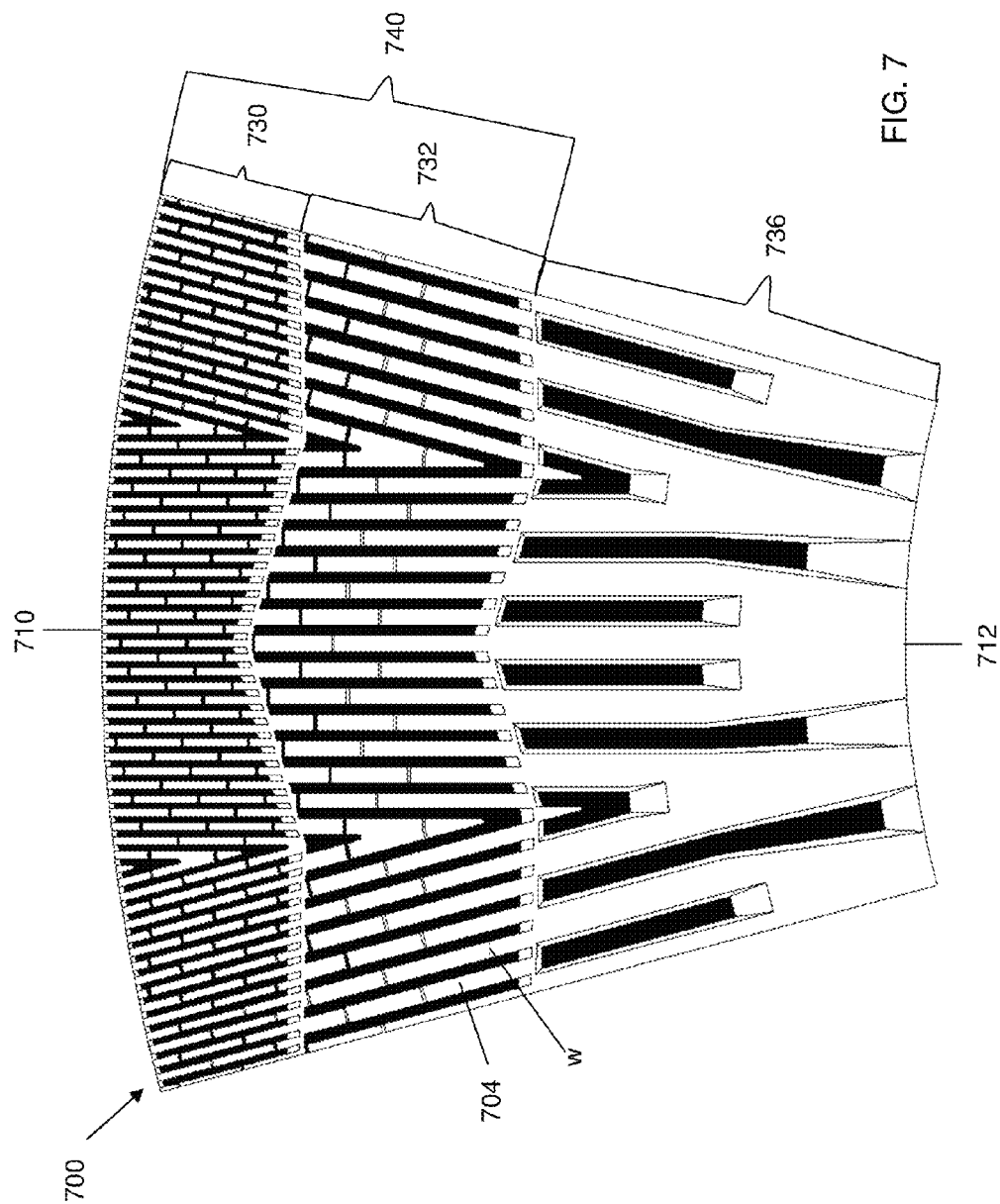
FIG. 7 is an illustration of another alternative embodiment of a refiner rotor plate segment pattern in accordance with the present invention.
Figure 8:
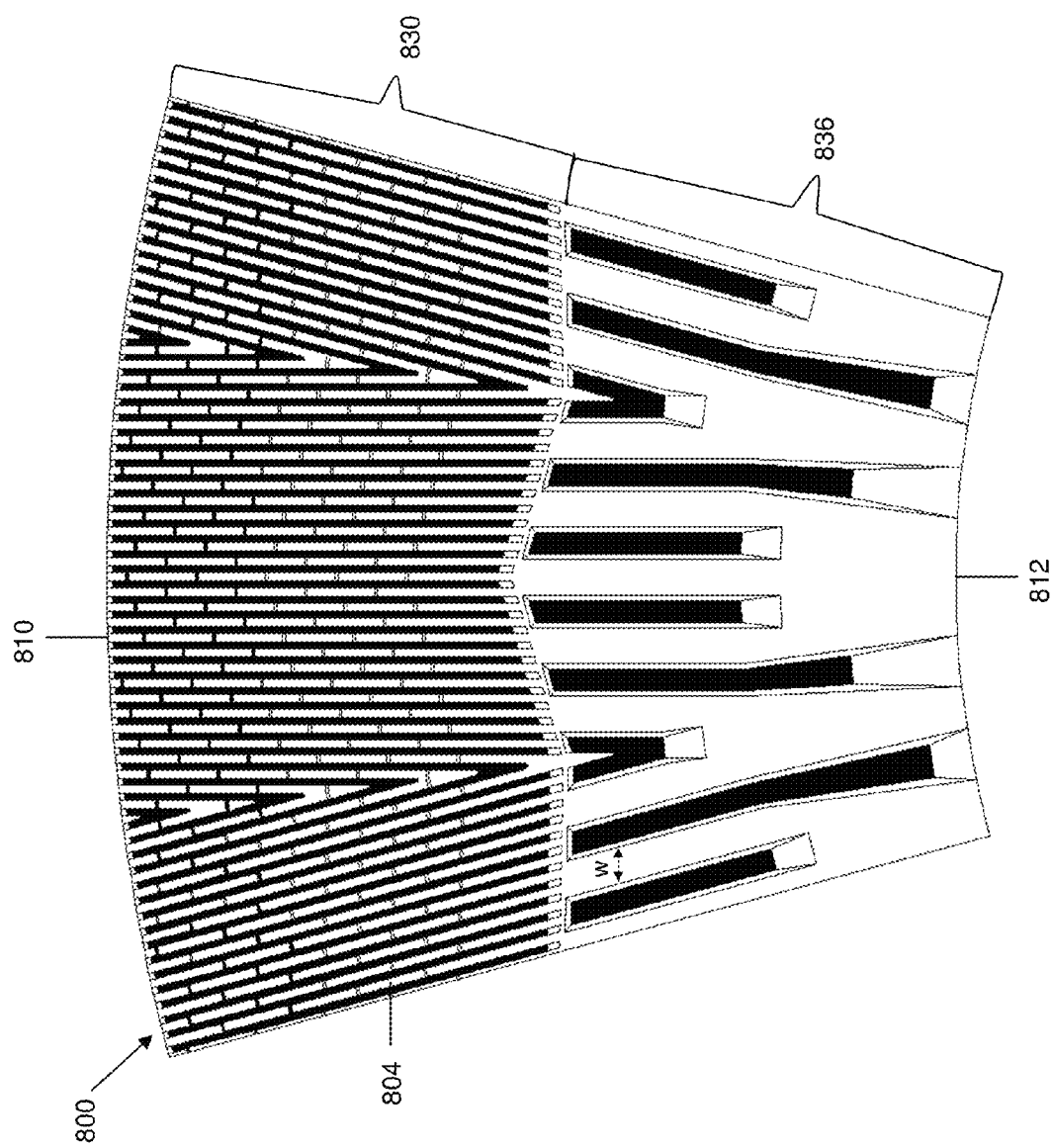
FIG. 8 is an illustration of another alternative embodiment of a refiner stator plate segment pattern in accordance with the present invention, suitable for use in combination with rotor plate segments of either FIG. 5 or FIG. 7.

FIGS. 5, 6, 7 and 8 show alternative embodiments of the present invention. FIG. 5 shows rotor plate segment 500 having three refining zones: 530, 532, 534, and a breaker bar zone 536. Lignocellulosic material is fed near inner edge 512 and travels toward outer edge 510 during the refining process. FIG. 6 shows stator plate segment 600 having two refining zones: 630 and 632, and a breaker bar zone 636. Lignocellulosic material is fed near inner edge 612 and travels toward outer edge 610. FIG. 7 shows rotor plate segment 700 having two refining zones: 730 and 732, and breaker bar zone 736. Lignocellulosic material is fed near inner edge 712 and travels toward outer edge 710. FIG. 8 shows stator plate segment 800 having a single refining zone 830 and a breaker bar zone 836. Lignocellulosic material is fed near inner edge 812 and travels toward outer edge 810.

In these embodiments, the rotor plate segments 500 and, 700, and stator plate segments 600 and 800 incorporate a breaker bar area (e.g., 536, 636, 736, and 836) in the inner part of the plates. This configuration is especially beneficial in connection with smaller diameter refiners, while larger refiners generally have a breaker bar area on a separate refiner plate segment that is located concentrically inward of the main refiner plate (e.g., such as those in FIGS. 1 and 2).

The present disclosure relates to the refining area 540, 640, and 740 and the refining zone 830, which is the outer half of the segment in this case. Combinations of the rotor plate segment 500 of FIG. 5 together with the stator plate segment 600 of FIG. 6, as well the rotor plate segment 700 of FIG. 7 together with the stator plate segment 800 of FIG. 8 are additional alternative embodiments of the present invention. Furthermore, combinations of the rotor plate segment 500 of FIG. 5 and the stator plate segment 800 of FIG. 8 is also an alternative embodiment.

In accordance with the present invention, the bars in all refining zones can be parallel to one another, or they can converge toward the periphery of the plate, diverge, or be radially arranged. In some embodiments, the bars have an average angle relative to the centerline of the refiner plate segment that is zero. The plate can therefore rotate in either a clockwise or a counter-clockwise direction, and the dynamic geometry of the plate will be the same in both directions, allowing the refiner to change rotational direction with equal performance. The plate design can be mirrored relative to the centerline of the refiner plate segment (although it is possible to have a bi-directional or reversible construction that is not mirrored relative to the centerline, and this would still be the same principle). The bar alignment on a bi-directional or reversible plate segment are often formed by parallel bars 502, running parallel to the central axis of the segment, and having potentially one or more fields 550 of parallel bars 502, meeting together in a V-shape 560 at the junction of fields 550. In other embodiments, the bars 502 are at a greater angle relative to the centerline of the segment, and meet in two areas, making a "W" shapes (not shown) rather than a "V" shape, e.g., such as is shown in the outer refining areas of FIG. 5. Such a construction is also bi-directional.

The stator plate segment 800 can be made with one refining zone 830 and can optionally have breaker bars 836, e.g., such as illustrated in FIG. 8. A stator plate segment 600 according to another embodiment of the invention, can have multiple refining zones 630 and 632, so long the groove width W of the innermost zone(s) 532, or 532 and 534, of the rotor plate segment 500 compared to the groove width W of the stator plate segment 600 refining area opposing such innermost zone(s) 532, or 532 and 534 is at least 50 percent, 75 percent 100 percent or 150 percent (or a percentage that is another multiple of 25 percent and is greater than 50 percent) wider. In this embodiment, the outermost zone(s) 530 of the rotor plate segment 500 have substantially equal groove widths W compared to that of the outermost zone(s) 630 of the stator plate segment 600.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for refining lignocellulosic material comprising:
 a bi-directional rotor plate segment comprising a first rotor plate refining area with at least one refining zone at a first radial distance range between an inner edge of the rotor plate segment and an outer edge of the rotor plate segment, the at least one refining zone having a refining zone length, and
 a bi-directional stator plate segment comprising a first stator plate segment refining area with at least one refining zone at a second radial distance range between an inner edge of the stator plate segment and an outer edge of the stator plate segment, the at least one refining zone having a refining zone length,
 wherein the first radial distance range and the second radial distance range overlap, the first rotor plate segment refining zone comprising a series of alternating bars and grooves, the grooves having a first rotor plate groove width, and the first stator plate segment refining zone comprising a series of alternating bars and grooves, the grooves having a first stator plate groove width, the first rotor plate groove width being at least 50% larger than the first stator plate groove width,
 wherein the rotor plate segment comprises a second rotor plate refining zone at a third radial distance range between the inner edge of the rotor plate segment and the outer edge of the rotor plate segment, the third radial distance range being closer to the outer edge of the rotor plate segment than the first radial distance range,
 wherein the stator plate segment comprises a second stator plate segment refining zone at a fourth radial distance range between the inner edge of the stator plate segment and an outer edge of the stator plate segment, wherein the third radial distance range and the fourth radial distance range overlap, the second rotor plate segment refining area having at least one refining zone comprising a series of alternating bars and grooves, the grooves having a second rotor plate groove width, and the second stator plate segment refining area having at least one refining zone comprising a series of alternating bars and grooves, the grooves having a second stator plate groove width, the second rotor plate groove width being substantially equal to the second stator plate groove width.

2. The system of claim 1, wherein the length of the second rotor plate refining zone is at least 10% and no longer than 50% of the distance between the inner edge of the rotor plate segment and the outer edge of the rotor plate segment.

3. The system of claim 1, wherein the length of the second rotor plate refining zone is at least 10% and no longer than 40% of the distance between the inner edge of the rotor plate segment and the outer edge of the rotor plate segment.

4. The system of claim 1, wherein the length of the second rotor plate refining zone is at least 10% and no longer than 30% of the distance between the inner edge of rotor plate segment and the outer edge of the rotor plate segment.

5. The system of claim 1, wherein the length of the second rotor plate refining zone is at least 10% and no longer than 20% of the distance between the inner edge of the rotor plate segment and the outer edge of the rotor plate segment.

6. The system of claim 1, wherein the length of the first rotor plate segment refining zone is at least 20% of the distance between the inner edge of the rotor plate segment and the outer edge of the rotor plate segment.

7. The system of claim 1, wherein the length of the first rotor plate segment refining zone is at least 30% of the distance between the inner edge of the rotor plate segment and the outer edge of the rotor plate segment.

8. The system of claim 1, wherein the length of the first rotor plate segment refining zone is at least 40% of the distance between the inner edge of the rotor plate segment and the outer edge of the rotor plate segment.

9. The system of claim 1, wherein the length of the first rotor plate segment refining zone is at least 50% of the distance between the inner edge of the rotor plate segment and the outer edge of the rotor plate segment.

10. The system of claim 1, wherein the first rotor plate groove width is at least X percent larger than the first stator plate groove width, where X is a multiple of 25 and is greater than or equal to 50.

11. The system of claim 10, wherein the third rotor plate groove is at least 30% wider than the third stator plate groove width.

12. The system of claim 10, wherein the third rotor plate groove is at least 40% wider than the third stator plate groove width.

13. The system of claim 10, wherein the first, second or third rotor plate groove width comprises two or more groove widths.

14. The system of claim 10, wherein the stator plate segment groove widths are the same in two or three refining zones.

15. The system of claim 10, wherein the first, second or third stator plate groove width comprises two or more groove widths.

16. The system of claim 1, wherein the second rotor plate groove width is no more than 10% wider than the second stator plate groove width.

17. The system of claim 1, wherein the second rotor plate groove width is no more the 15% wider than the second stator plate groove width.

18. The system of claim 1, wherein the rotor plate segment comprises a third rotor plate refining zone at a fifth radial distance range between the inner edge of the rotor plate segment and the outer edge of the rotor plate segment, the fifth radial distance range being located between the first radial distance range and the third radial distance range, wherein the stator plate segment comprises a third stator plate segment refining zone at a sixth radial distance range between the inner edge of the stator plate segment and an outer edge of the stator plate segment, wherein the fifth radial distance range and the sixth radial distance range overlap, the third rotor plate segment refining zone comprising a series of alternating bars and grooves, the grooves having a third rotor plate groove width, and the third stator plate segment refining zone comprising a series of alternating bars and grooves, the grooves having a third stator plate groove width, the third rotor plate groove width being at least 20% wider than the third stator plate groove width.

19. The system of claim 18, wherein the rotor plate segment comprises a rotor feeding zone at a seventh radial distance range between the inner edge of the rotor plate segment and the outer edge of the rotor plate segment, the seventh radial distance range starting at the inner edge of the rotor plate segment, and wherein the stator plate segment comprises a stator feeding zone at an eighth radial distance range between the inner edge of the stator plate segment and an outer edge of the stator plate segment, wherein the seventh radial distance range and the eighth radial distance range overlap.

20. The system of claim 1, further comprising a conical refining zone.

21. A bi-directional refiner plate combination for a disk refiner, comprising:

a rotor plate and a stator plate each having a pattern side and a back side, mounted such that the pattern sides of the rotor and stator plates oppose each other, the rotor and stator plates each comprising rotor plate segments having a refining area and stator plate segments having a refining area, respectively, the refining area having a length, the rotor plate and stator plate having an inner refining area edge and an outer refining area edge, the rotor plate segment has at least an innermost and an outermost refining zone within the refining area on the pattern sides, each at a radial distance range between the inner refining area edges and outer refining area edges of the rotor plate segment, each radial distance range having a length, wherein the stator plate segment has at least an innermost and an outermost refining zone within the refining area on the pattern side, each at a corresponding radial distance range between the inner refining area edges and the outer refining area edges of the stator plate segment, each corresponding radial distance range having a length, wherein the at least one of the rotor plate segment innermost or outermost refining zones has a different pattern of bars and grooves from the at least one of the innermost or outermost stator plate segment refining zones, wherein an innermost refining zone of the rotor plate segment refining area and an innermost refining zone of the stator plate segment refining area are closest to the inner refining area edges of the rotor plate segment and stator plate segment, and wherein the grooves of the rotor plate segment at the radial distance range are substantially wider than the grooves of the stator plate segment at the corresponding radial distance range, such that wider rotor plate grooves oppose narrower stator plate grooves, and wherein length of the innermost refining zone of the rotor plate segment represents at least 20 percent of the refining area length, while the outermost zone represents no more than 50% of the refining area length.

22. The refiner plate of claim 21 wherein the refining area of the rotor plate segment has an intermediate refining zone within the refining area, the intermediate refining zone at a radial distance range between the innermost and the outermost refining zones of the refining area, wherein the grooves of the rotor plate segment in the intermediate refining zone are at least 20% wider than the grooves of the stator plate segment in the same radial distance range.

23. The refiner plate of claim 21, wherein the refiner plate segments further comprise a breaker bar zone located between the inner edge of the refiner plate segments and the refining area.

* * * * *